(12) United States Patent
Krenn

(10) Patent No.: US 9,384,616 B2
(45) Date of Patent: Jul. 5, 2016

(54) CHIP HANDLING DEVICES AND RELATED METHODS

(71) Applicant: Shuffle Master GmbH & Co KG, Vienna (AT)

(72) Inventor: Peter Krenn, Neufeld (AT)

(73) Assignee: Shuffle Master GmbH & Co KG, Vienna (AT)

( * ) Notice: Subject to any disclaimer, the term of this patent is extended or adjusted under 35 U.S.C. 154(b) by 126 days.

(21) Appl. No.: 14/312,227

(22) Filed: Jun. 23, 2014

(65) Prior Publication Data
US 2014/0302762 A1    Oct. 9, 2014

Related U.S. Application Data

(62) Division of application No. 13/714,843, filed on Dec. 14, 2012, now Pat. No. 8,757,349, and a division of application No. 12/610,974, filed on Nov. 2, 2009, now Pat. No. 8,336,699.

(51) Int. Cl.
*G07D 3/16* (2006.01)
*G07D 3/14* (2006.01)
*G07D 9/00* (2006.01)
*G07D 3/00* (2006.01)

(52) U.S. Cl.
CPC .. *G07D 3/16* (2013.01); *G07D 3/00* (2013.01); *G07D 3/14* (2013.01); *G07D 9/008* (2013.01)

(58) Field of Classification Search
CPC ............ G07D 3/00; G07D 3/16; G07D 9/002
USPC ........... 194/342; 453/4, 18, 30, 33, 34, 35, 57
See application file for complete search history.

(56) References Cited

U.S. PATENT DOCUMENTS

| | | | |
|---|---|---|---|
| 1,200,843 | A | 10/1916 | Baur |
| 1,241,632 | A | 10/1917 | Johnson |
| 1,813,296 | A | 7/1931 | Kidwell |

(Continued)

FOREIGN PATENT DOCUMENTS

| | | |
|---|---|---|
| AT | 006405 | 10/2003 |
| AT | 006 546 | 12/2003 |

(Continued)

OTHER PUBLICATIONS

Cover sheet of 1993 video tape describing the Chipmaster (author unknown).

(Continued)

*Primary Examiner* — Mark Beauchaine
(74) *Attorney, Agent, or Firm* — TraskBritt

(57) ABSTRACT

Chip sorting devices and methods of ejecting chips from chip wells are disclosed. In some embodiments, chip sorting devices may include at least one chip ejection unit including at least one finger member selectively movable between a first position outside of at least one channel of a chip conveying unit and a second position within the at least one channel. In additional embodiments, a chip sorting device may include a separating wheel comprising a plurality of chip wells, each chip well configured to hold a plurality of chips. In yet additional embodiments, methods of ejecting a chip from a chip well may include urging a selected chip out of the chip well with the at least one finger member and at least one wall segment of a trailing segmented wall of the chip well.

18 Claims, 11 Drawing Sheets

(56) References Cited

U.S. PATENT DOCUMENTS

| | | | |
|---|---|---|---|
| 1,947,456 A * | 2/1934 | Bock | 453/13 |
| 2,020,293 A | 11/1935 | Adelstein | |
| 2,073,789 A | 3/1937 | Gee | |
| 2,231,093 A | 2/1941 | Seemel | |
| 2,904,151 A | 9/1959 | Johnson | |
| 3,143,118 A | 8/1964 | Haines | |
| 3,371,761 A | 3/1968 | Ryo | |
| 3,387,616 A | 6/1968 | Bortz et al. | |
| 3,435,833 A | 4/1969 | Tanaka | |
| 3,497,047 A | 2/1970 | Mobley | |
| 3,583,410 A | 6/1971 | Bayha et al. | |
| 3,680,566 A | 8/1972 | Tanaka et al. | |
| 3,766,452 A | 10/1973 | Burpee et al. | |
| 3,771,538 A | 11/1973 | Reis | |
| 3,827,582 A | 8/1974 | Lederer | |
| 3,902,511 A * | 9/1975 | Jacobs | 453/32 |
| 4,010,766 A | 3/1977 | Bowles | |
| 4,157,139 A | 6/1979 | Bjork | |
| 4,161,381 A | 7/1979 | Sciortino | |
| 4,164,232 A * | 8/1979 | Nakai et al. | 453/32 |
| 4,209,960 A | 7/1980 | Deutschlander et al. | |
| 4,275,751 A | 6/1981 | Bergman | |
| 4,360,034 A | 11/1982 | Davila et al. | |
| 4,427,389 A | 1/1984 | D'Andrade | |
| 4,531,531 A | 7/1985 | Johnson et al. | |
| 4,543,969 A | 10/1985 | Rasmussen | |
| 4,607,649 A | 8/1986 | Taipale et al. | |
| 4,681,128 A | 7/1987 | Ristvedt et al. | |
| 4,731,043 A | 3/1988 | Ristvedt et al. | |
| 4,775,354 A | 10/1988 | Rasmussen et al. | |
| 4,863,414 A | 9/1989 | Ristvedt | |
| 4,902,263 A | 2/1990 | Ito et al. | |
| 4,966,570 A | 10/1990 | Ristvedt et al. | |
| 5,011,455 A | 4/1991 | Rasmussen | |
| 5,011,456 A | 4/1991 | Kobayashi et al. | |
| 5,022,889 A | 6/1991 | Ristvedt et al. | |
| 5,042,810 A | 8/1991 | Williams | |
| 5,074,434 A | 12/1991 | Maki | |
| 5,141,443 A | 8/1992 | Rasmussen et al. | |
| 5,166,502 A | 11/1992 | Rendleman et al. | |
| 5,207,612 A | 5/1993 | Wollaston | |
| 5,277,651 A | 1/1994 | Rasmussen et al. | |
| 5,406,264 A | 4/1995 | Plonsky et al. | |
| 5,460,295 A | 10/1995 | Law | |
| 5,472,074 A | 12/1995 | Milcetic | |
| 5,531,331 A | 7/1996 | Barnett | |
| 5,551,542 A | 9/1996 | Stockli | |
| 5,607,352 A | 3/1997 | Tani | |
| 5,624,308 A | 4/1997 | Rumbach | |
| 5,651,548 A | 7/1997 | French et al. | |
| 5,735,742 A | 4/1998 | French | |
| 5,755,618 A | 5/1998 | Mothwurf | |
| 5,757,876 A | 5/1998 | Dam et al. | |
| 5,770,533 A | 6/1998 | Franchi | |
| 5,781,647 A | 7/1998 | Fishbine et al. | |
| 5,827,117 A | 10/1998 | Naas | |
| 5,836,583 A | 11/1998 | Towers | |
| 5,865,673 A | 2/1999 | Geib et al. | |
| 5,895,321 A | 4/1999 | Gassies et al. | |
| 5,931,732 A | 8/1999 | Abe et al. | |
| 5,933,244 A | 8/1999 | Kiritchenko | |
| 5,947,257 A | 9/1999 | Schwartz | |
| 5,950,796 A | 9/1999 | Kobayashi | |
| 5,957,262 A | 9/1999 | Molbak et al. | |
| 5,957,776 A | 9/1999 | Hoehne et al. | |
| 6,021,949 A | 2/2000 | Boiron et al. | |
| 6,075,217 A | 6/2000 | Kiritchenko | |
| 6,080,056 A | 6/2000 | Karlsson | |
| 6,139,418 A | 10/2000 | Geib et al. | |
| 6,168,001 B1 | 1/2001 | Davis | |
| 6,186,895 B1 | 2/2001 | Oliver | |
| 6,193,599 B1 | 2/2001 | Kurosawa et al. | |
| 6,260,757 B1 | 7/2001 | Strisower | |
| 6,264,109 B1 | 7/2001 | Chapet et al. | |
| 6,283,856 B1 | 9/2001 | Mothwurf | |
| 6,296,190 B1 | 10/2001 | Rendleman | |
| 6,313,871 B1 | 11/2001 | Schubert | |
| 6,381,294 B1 | 4/2002 | Britton | |
| 6,464,584 B2 | 10/2002 | Oliver | |
| 6,506,115 B1 | 1/2003 | Mothwurf | |
| 6,532,297 B1 | 3/2003 | Lindquist | |
| 6,540,602 B2 | 4/2003 | Adams et al. | |
| 6,567,159 B1 | 5/2003 | Corech | |
| 6,572,474 B2 | 6/2003 | Rudd | |
| 6,581,747 B1 | 6/2003 | Charlier et al. | |
| 6,592,445 B2 | 7/2003 | Lee | |
| 6,629,591 B1 | 10/2003 | Griswold et al. | |
| 6,733,388 B2 | 5/2004 | Mothwurf | |
| 6,753,830 B2 | 6/2004 | Gelbman | |
| 6,772,870 B2 | 8/2004 | Sugai et al. | |
| 6,976,589 B2 | 12/2005 | De Raedt et al. | |
| 7,004,831 B2 | 2/2006 | Hino et al. | |
| 7,014,554 B1 | 3/2006 | Fletcher et al. | |
| 7,028,826 B2 | 4/2006 | De Raedt et al. | |
| 7,066,335 B2 | 6/2006 | Aas et al. | |
| 7,201,268 B2 | 4/2007 | DeMeutter et al. | |
| 7,244,175 B2 | 7/2007 | Adams et al. | |
| 7,681,708 B2 | 3/2010 | De Raedt et al. | |
| 7,861,868 B2 | 1/2011 | Blaha et al. | |
| 7,934,980 B2 | 5/2011 | Blaha et al. | |
| 7,992,720 B2 | 8/2011 | Blaha et al. | |
| 8,006,847 B2 | 8/2011 | Blaha et al. | |
| 8,202,144 B2 * | 6/2012 | Hino et al. | 453/6 |
| 8,298,052 B2 | 10/2012 | DeRaedt et al. | |
| 8,336,699 B2 | 12/2012 | Blaha et al. | |
| 8,393,942 B2 | 3/2013 | Blaha et al. | |
| 8,678,164 B2 | 3/2014 | DeRaedt et al. | |
| 8,757,349 B2 | 6/2014 | Blaha et al. | |
| 2002/0061724 A1 | 5/2002 | Nomura | |
| 2002/0074209 A1 | 6/2002 | Karlsson | |
| 2004/0149539 A1 | 8/2004 | De Raedt et al. | |
| 2005/0155838 A1 | 7/2005 | Raedt et al. | |
| 2005/0280212 A1 | 12/2005 | Blaha et al. | |
| 2007/0099553 A1 | 5/2007 | Blaha et al. | |
| 2007/0212996 A1 | 9/2007 | Ryou | |
| 2009/0047889 A1 * | 2/2009 | Adams et al. | 453/5 |
| 2011/0306284 A1 | 12/2011 | Blaha et al. | |
| 2014/0202825 A1 | 7/2014 | DeRaedt et al. | |

FOREIGN PATENT DOCUMENTS

| | | |
|---|---|---|
| AT | 007 854 | 10/2005 |
| CA | 2090073 | 8/1994 |
| CA | 2229054 | 8/1996 |
| CA | 2229053 | 10/1996 |
| DE | 3144327 A1 | 5/1983 |
| DE | 4240886 | 7/1994 |
| EP | 0424355 | 11/1994 |
| EP | 0631260 | 12/1994 |
| EP | 0757582 | 2/1997 |
| EP | 0806020 | 12/1998 |
| EP | 1080348 | 8/2002 |
| EP | 0823041 | 9/2002 |
| EP | 0950989 | 9/2003 |
| EP | 1050024 | 3/2004 |
| FR | 2 749 093 | 7/1998 |
| FR | 2 752 078 | 10/1998 |
| GB | 720 707 | 12/1954 |
| GB | 1 255 492 | 12/1971 |
| GB | 1 571 219 | 7/1980 |
| GB | 2 061 490 | 5/1981 |
| GB | 2 198 274 | 6/1988 |
| GB | 2 203 582 | 10/1988 |
| GB | 2 254 419 | 10/1992 |
| GB | 2 333 632 | 7/1999 |
| IT | 94 A001040 | 12/1994 |
| WO | 91/17842 | 11/1991 |
| WO | 92/11953 | 7/1992 |
| WO | 95/28996 | 11/1995 |
| WO | 96/23281 | 8/1996 |
| WO | 96/34258 | 10/1996 |
| WO | 99/38126 | 7/1999 |
| WO | 99/60353 | 11/1999 |
| WO | 03/049045 | 6/2003 |

(56) References Cited

FOREIGN PATENT DOCUMENTS

| WO | 03/103860 | 12/2003 |
| WO | 2004/009256 A1 | 1/2004 |
| WO | 2004/069431 A2 | 8/2004 |
| WO | 2008/046561 A1 | 4/2008 |
| WO | 2011/051700 A1 | 5/2011 |

OTHER PUBLICATIONS

Chipmaster Training handouts from Jan. 1994 (author unknown), (65 pages).
Huxley's advertisement for Chipmaster: Huxley's count on the Chipmaster deal, ("Casino World" is distributed in the U.S.) Mar. 1994 (author unknown) (1 page).
Show report for Chipmaster in Monte Carlo by Christian Pohanka, Mar. 23, 1993, (4 pages).
Trial installation of Chipmaster at Holland Casinos, report by Christian Pohanka, Sep. 29, 1993 (5 pages).
Report from Spain regarding Chipmaster by Christina Pohanka, Sep. 26, 1993 (5 pages).
Photograph of first Chipmaster installation at Casino Baden (Austria), Jan. 4, 2004 (photographer unknown).
Photograph of first Chipmaster installation at Holland Casinos, Jan. 4, 2004 (photographer unknown).
Photograph of first Chipmaster installation at Valencia (Spain), Jan. 4, 2004 (photographer unknown).
Photograph of Chipmaster production at VICOMA, Vienna, Jan. 4, 2005 (photographer unknown).
Photographs of Chipmaster in Paulson Booth at Apr. 26-27, 1994 Show (photographer unknown), (4 pages).
International Search Report dated Mar. 6, 2008, for International Application No. PCT/EP2007/008873 (2 pages).
PCT International Search Report for International Application No. PCT/US04/02331 dated Jun. 23, 2006 (2 pages).
Written Opinion for Application No. PCT/US04/02331, dated Jun. 23, 2006 (3 pages).
International Preliminary Report for Application No. PCT/US04/02331, dated Dec. 14, 2006 (3 pages).
International Preliminary Report for Application No. PCT/EP2007/008873, dated Apr. 22, 2009, 6 pages.
Written Opinion for Application No. PCT/EP2007/008873, dated Mar. 6, 2008, 5 pages.
PCT International Search Report and Written Opinion of the International Searching Authority for PCT/GB2010/051763, dated Mar. 30, 2011, 14 pages.

\* cited by examiner

CHIP HANDLING DEVICES AND RELATED METHODS

CROSS-REFERENCE TO RELATED APPLICATIONS

This application is a divisional of U.S. patent application Ser. No. 13/714,843, filed Dec. 14, 2012, now U.S. Pat. No. 8,757,349, issued Jun. 24, 2014, which is a divisional of U.S. patent application Ser. No. 12/610,974, filed Nov. 2, 2009, now U.S. Pat. No. 8,336,699, issued Dec. 25, 2012, the disclosure of each of which is hereby incorporated herein by this reference in its entirety by this reference.

TECHNICAL FIELD

The invention relates to chip sorting devices and related methods. In particular, embodiments of the invention relate to chip sorting devices, chip ejection units for chip sorting devices, separating wheels for chip sorting devices and methods of ejecting chips.

BACKGROUND

Given the current economic circumstances, reduced gaming revenues, and desire to improve profitability, there is a need to reduce costs through cost savings and replacement costs due to wear and tear on equipment. For example, there is a need for improved chip sorting devices, which may have the same profile as existing equipment to avoid retrofitting existing gaming tables and that have adjustable mounting structures that permit limited movement of the device adjacent the gaming table surface. Additionally, it may be desirable to develop improved chip sorting devices having reduced production cost, which may improve efficiency, improve reliability, reduce wear on chips and minimize noise to preserve the casino ambience.

In view of the foregoing, improved chip sorting devices and improved methods relating to sorting chips would be desirable.

BRIEF SUMMARY

In some embodiments, a chip sorting device may include a frame and a chip conveying unit. The chip conveying unit may include at least one chip well configured to receive a chip therein, the at least one chip well adjacent to at least one segmented guide wall comprising a plurality of wall segments spaced upon the wheel and defining at least one channel therebetween. Additionally, at least one chip ejection unit may be configured to eject at least one chip outward from the at least one chip well of the chip conveying unit. Each chip ejection unit may include at least one finger member selectively movable between a first position outside of the at least one channel and a second position within the at least one channel.

In additional embodiments, a chip sorting device may include a chip hopper chamber and a chip sorting chamber, separate from the chip hopper chamber and connected to the chip hopper chamber by an opening. The chip sorting device may further include a separating wheel positioned within the chip hopper chamber, the separating wheel comprising a plurality of radially extending arms defining a plurality of chip wells. Each chip well of the plurality of chip wells may be configured to hold a plurality of chips and to carry chips in a circumferential path and deposit chips in the opening into the chip sorting chamber. The chip sorting device may also include a chip counting device positioned within the chip hopper chamber and configured to count a number of chips carried within each chip well of the plurality of chip wells.

In yet additional embodiments, a method of ejecting a chip from a chip well, may include carrying a selected chip along a path in a chip well of a chip conveying unit and positioning at least one finger member of at least one ejection unit into the path of the selected chip, preceding the selected chip. Additionally the method may include moving the selected chip relative to the at least one finger member to cause the selected chip to contact the at least one finger member and urging the selected chip out of the chip well with the at least one finger member and at least one wall segment of a trailing segmented wall of the chip well.

DETAILED DESCRIPTION

The illustrations presented herein are not meant to be actual views of any particular device or system, but are merely idealized representations that are employed to describe various embodiments of the present invention. It is noted that elements that are common between figures may retain the same numerical designation.

Figure 1:
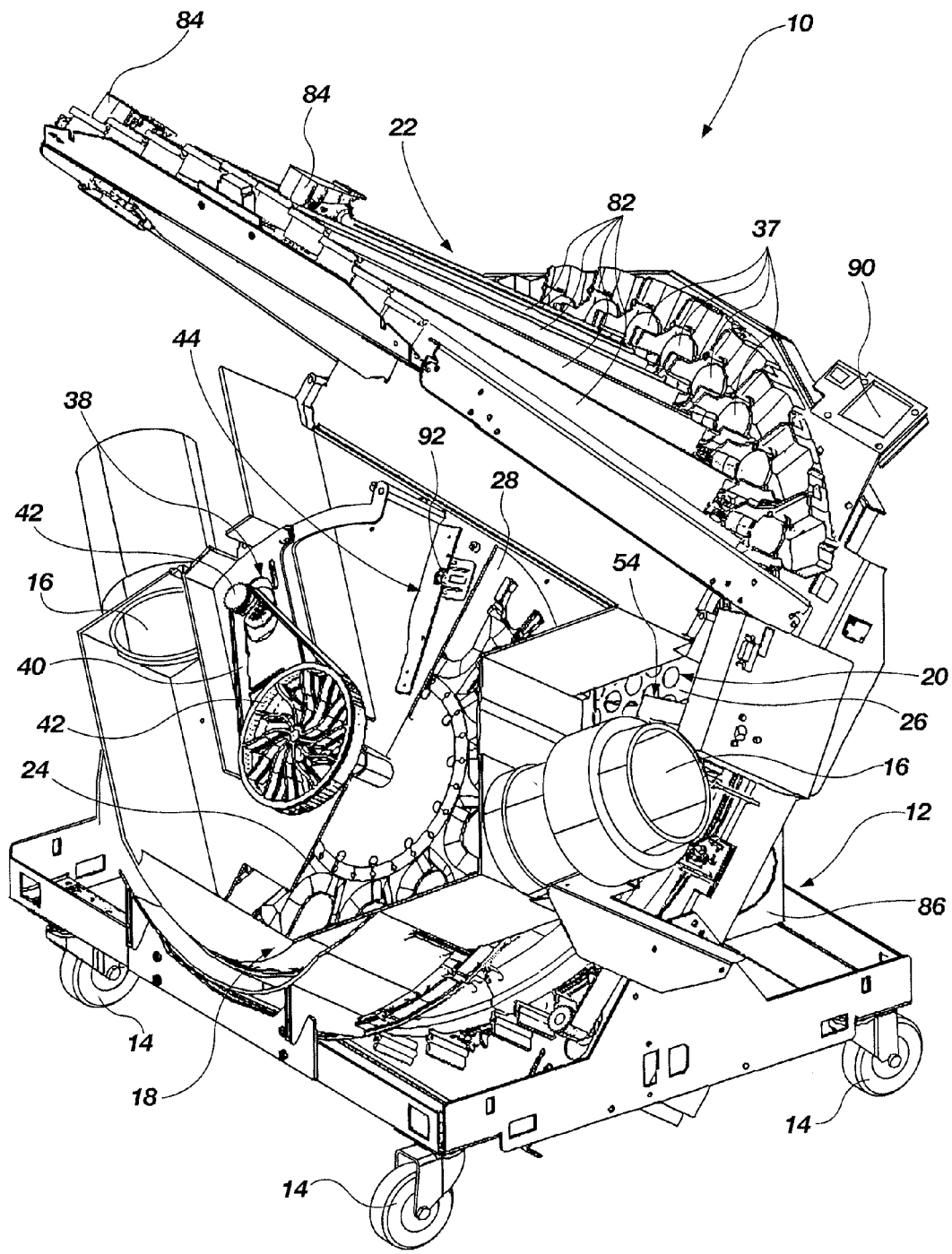
FIG. 1 shows an isometric view of a chip sorting device, according to an embodiment of the present invention, with portions of housings removed to show interior components of the chip sorting device.

An isometric view of a chip sorting device 10 with portions of housings removed to show interior components of the chip sorting device 10 is shown in FIG. 1. As shown, the chip sorting device 10 may comprise a frame assembly 12, castors 14, one or more chip inlet tubes 16, a chip hopper chamber 18, a chip sorting chamber 20, and a chip rack 22. The chip sorting device 10 may further include a first chip conveying unit, such as a pre-separator wheel 24 rotatably mounted within the chip hopper chamber 18, and a second chip conveying unit, such as a sorting wheel 26 rotatably mounted within the chip sorting chamber 20.

Figure 2:
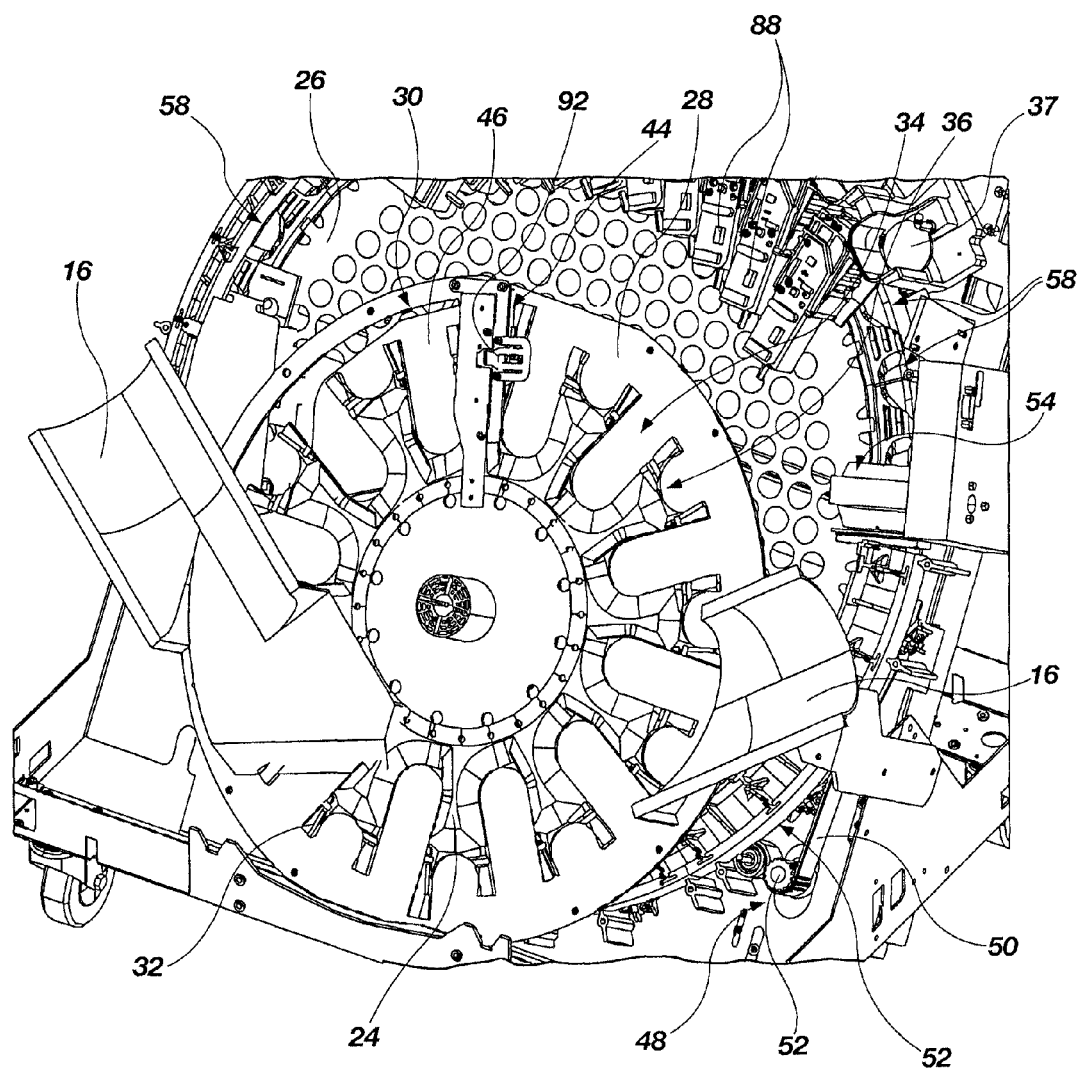
FIG. 2 shows an isometric detail view of the chip sorting device of FIG. 1 having additional portions of housings removed to show interior components of the chip sorting device.

The pre-separator wheel 24 may be positioned on an intermediate wall 28, which may be viewed more clearly in FIG. 2, which shows an isometric detail view of the chip sorting device 10 with additional portions of housings removed to show interior components. The intermediate wall 28 may separate the chip hopper chamber 18 from the chip sorting chamber 20 and an opening 30 formed in the intermediate wall 28 may provide a pathway therebetween.

The pre-separator wheel 24 may be mounted for rotation about a central axis and may include a plurality of radially extending arms 32 defining a plurality of chip wells 34, 36. Each chip well 34, 36 may be configured to hold a plurality of chips 37, for example, each chip well 34, 36 may hold two chips 37. For example, elongated chip wells 34 may each hold two chips 37 positioned edge-to-edge, a first chip 37 positioned radially inward of a second chip 37, and deep chip wells 36 may hold two chips 37 in a stacked configuration, a first chip 37 positioned axially beneath a second chip 37. Additionally, elongated chip wells 34 and deep chip wells 36 may alternate around the circumference of the pre-separator wheel 24, which may allow a greater number of chip wells 34, 36 to be arranged in the pre-separator wheel 24 when compared to an arrangement including only elongated chip wells 34.

A motor 38, such as one of a stepper motor and a servomotor, may be coupled to the pre-separator wheel 24, such as by a toothed belt 40 and cogs 42 (FIG. 1), and may be configured to rotate the pre-separator wheel 24 and determine the position of the pre-separator wheel 24. A chip counting device 44 may also be included within the chip hopper chamber 18 and may be located near the opening 30 in the intermediate wall 28, over the circumferential path of the chip wells 34, 36 as the pre-separator wheel 24 rotates.

A chip delivery ramp 46 (FIG. 2) may be attached to the opening 30 in the intermediate wall 28, extending from the opening 30 and sloping from the intermediate wall 28 into the chip sorting chamber 20 and toward the sorting wheel 26.

Figure 3:
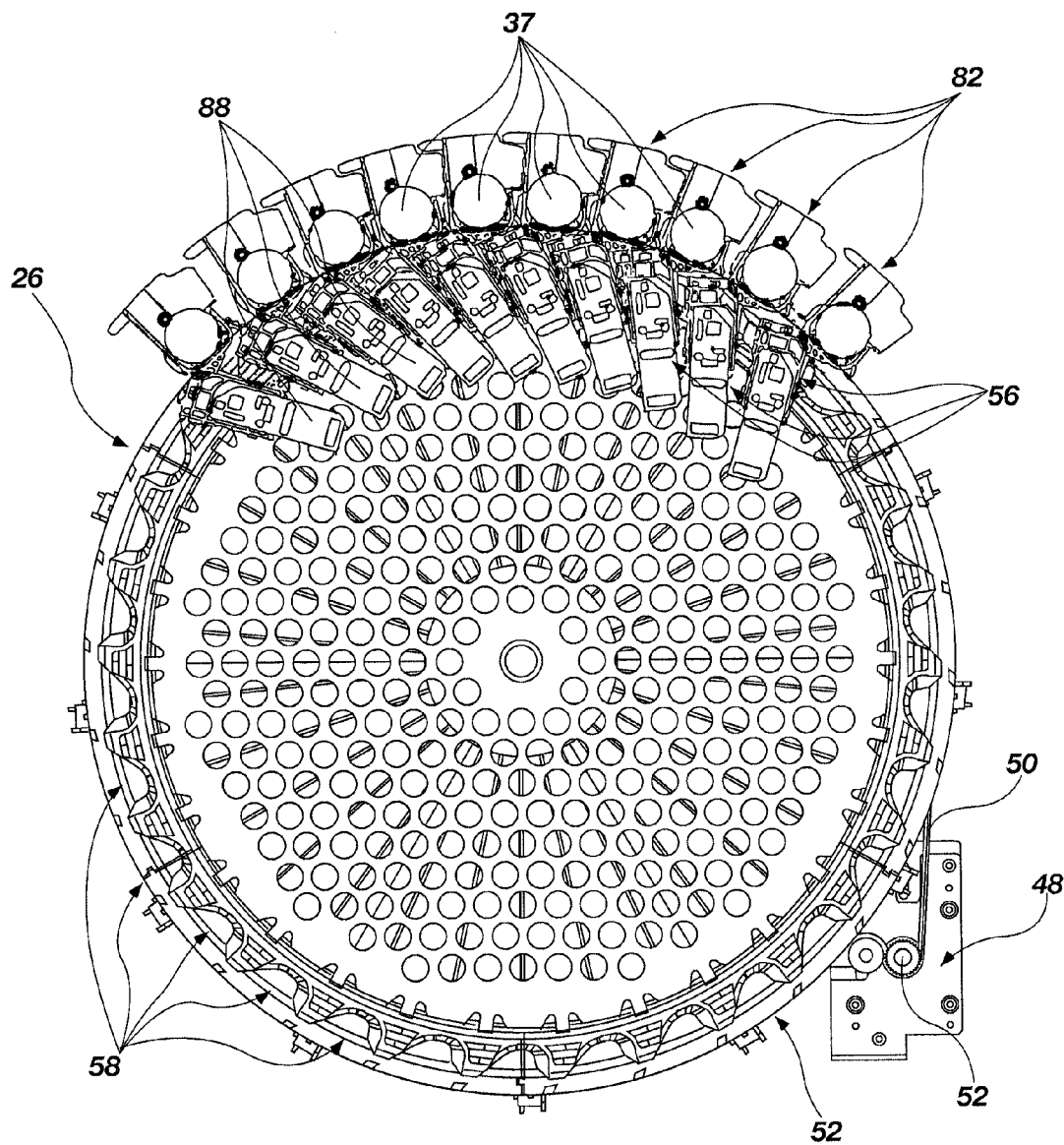
FIG. 3 shows an isometric view of a sorting wheel and a plurality of ejection units of the chip sorting device of FIG. 1.

As shown in FIG. 3, the sorting wheel 26 may be mounted for rotation on the frame assembly 12 about a central axis by a motor 48, such as one of a stepper motor and a servomotor, coupled to the sorting wheel 26, such as by a toothed belt 50 and cogs 52. In addition to rotating the sorting wheel 26, the motor 48 may be configured to determine the rotational position of the sorting wheel 26. A chip identification unit 54 (FIGS. 1 and 2) and a plurality of chip ejection units 56 may also be included within the chip sorting chamber 20. The sorting wheel 26 may include a plurality of chip wells 58, each configured to receive a chip 37 therein and transport the chip 37 along a circumferential path. The chip identification unit 54 may be positioned near the circumferential path of the chip wells 58 of the sorting wheel 26 to identify at least one chip feature and the chip ejection units 56 may be positioned to eject chips 37 from the sorting wheel 26 into the chip rack 22.

Figure 4:
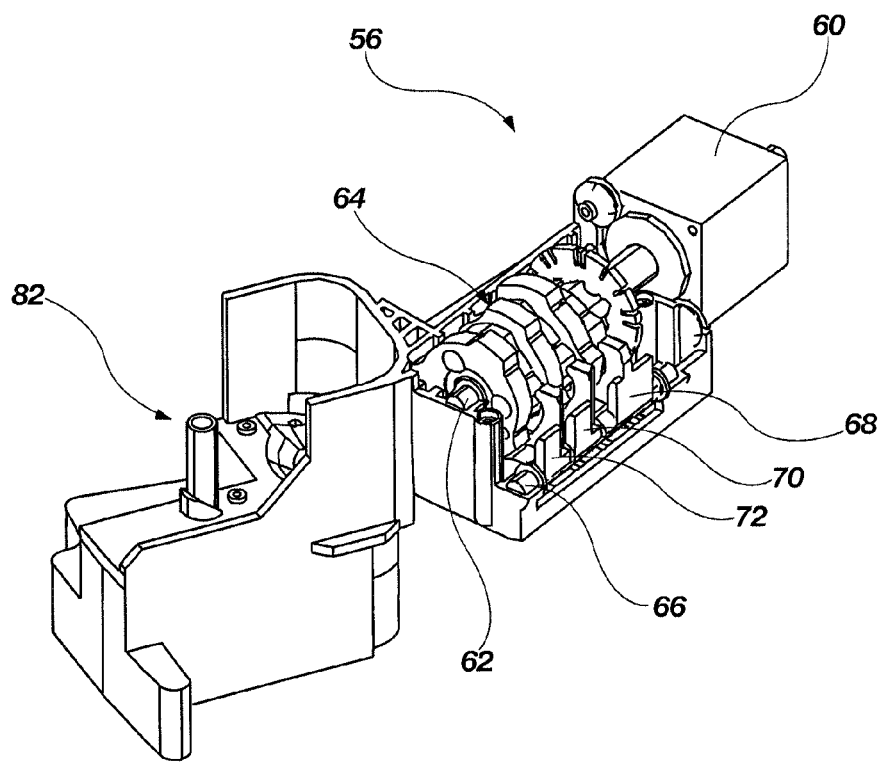
FIG. 4 shows an isometric view of a chip ejection unit of FIG. 3 having portions removed to show a cam shaft and lever assemblies of the chip ejection unit, and also shows a portion of a chip tray of a chip rack, the portion including an opening into the chip tray.
Figure 5:
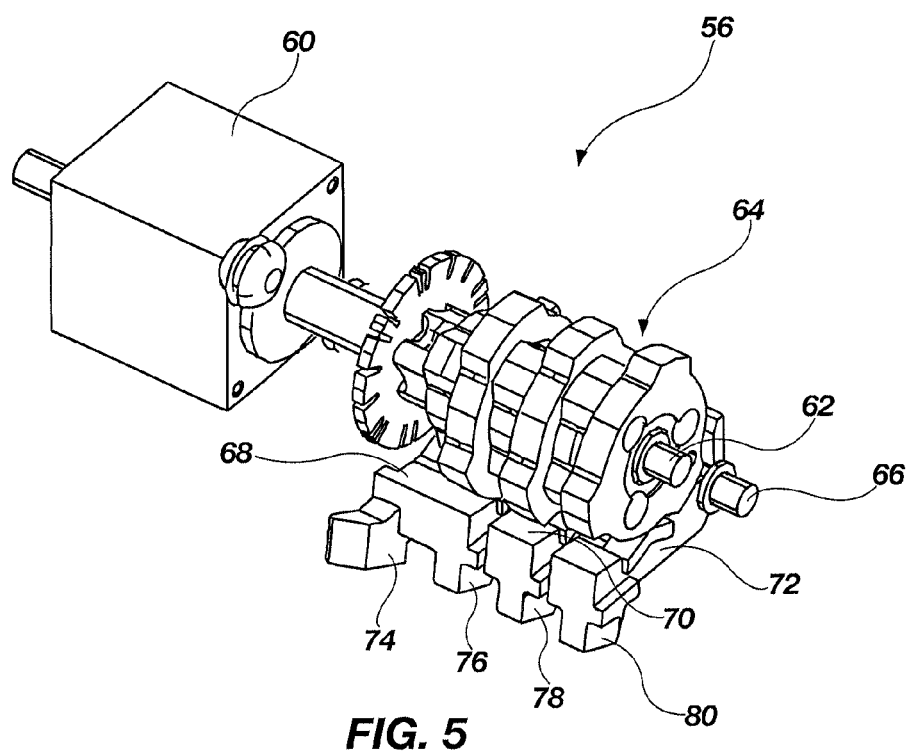
FIG. 5 shows another isometric view of the chip ejection unit of FIG. 3 having additional portions removed to show the cam shaft and lever assemblies of the chip ejection unit.

As shown in FIGS. 4 and 5, each chip ejection unit 56 may comprise a motor 60, such as one of a stepper motor and a servomotor, attached to a cam shaft 62 supporting a plurality of cams 64, such as tri-lobe cams, thereon and a lever shaft 66 supporting a plurality of lever assemblies 68, 70, 72, each lever assembly 68, 70, 72 including one or more finger members 74, 76, 78, 80 at one end. For example, a first lever assembly 68 may include a first finger member 74 and a second finger member 76, a second lever assembly 70 may include a third finger member 78 and a third lever assembly 72 may include a fourth finger member 80.

As shown in FIG. 1, the chip rack 22 may include a plurality of elongated chip trays 82, each chip tray 82 of the plurality of elongated chip trays 82 corresponding to a chip ejection unit 56 (FIG. 3), for holding chips 37 ejected from the sorting wheel 26 by the chip ejection units 56. For example, the chip rack 22 may include ten chip trays 82 for holding chips 37 in a stacked configuration, one chip 37 stacked axially over another. The chip rack 22 may further include one or more cutters 84 for separating a predetermined number of chips 37 from a chip tray 82 into a stack and to facilitate the removal of chips 37 from the chip rack 22.

The chip sorting device 10 may further include a main controller 86 configured to communicate with electrical and electromechanical devices of the chip sorting device 10, such as the motors 38, 48, 60, the chip counting device 44, the chip identification unit 54, drive boards 88 (FIGS. 2 and 6) for the chip ejection units 56, the cutters 84, a display and input device, such as a touch screen liquid crystal display (LCD)

device 90. The main controller 86 may be programmed with software to facilitate the operation of the main controller 86 and the main controller 86 may be configured to facilitate the operation of the chip sorting device 10 and to respond to inputs by a user through the touch screen LCD device 90.

In operation, a mixture of chips 37 having varied identifying features may be inserted into the chip hopper chamber 18 through one or more of the chip inlet tubes 16 (FIG. 1). For example, the chip sorting device 10 may be positioned beneath a gaming table (not shown), such as a roulette table, with the chip rack 22 extending from an edge of the gaming table and a chip inlet tube 16 extending to an opening in the surface of the gaming table. Chips 37 issued to players may have different colors, or other identifying features, which may identify the chips 37 used by each player, identify the denominational value of a chip 37, and indicate other information as desired. At certain intervals during game play, an operator (not shown) may move mixed chips 37 from the gaming surface to the opening in the gaming table, to be sorted by the chip sorting device 10. Optionally, the chip sorting device 10 may be separate from a gaming table, such as in a counting room of a casino (not shown).

The mixture of chips 37 may come to rest at the bottom of the chip hopper chamber 18 (FIG. 1) of the chip sorting device 10 and may be urged by gravity toward the intermediate wall 28, which may be situated at about 40 degrees off plumb. The pre-separator wheel 24 may be rotated along the intermediate wall 28 by the motor 38 (FIG. 1), such as in a counter-clockwise direction, and chips 37 located at the bottom of the chip hopper chamber 18 may become positioned within the chip wells 34, 36 defined by the radially extending arms 32 of the pre-separator wheel 24. The chips 37 positioned within the chip wells 34, 36 may then be carried in a circumferential path along the intermediate wall 28 by the pre-separator wheel 24 toward the opening 30 in the intermediate wall 28 (FIG. 2). The chips 37 may be carried past the chip counting device 44, which may count the number of chips 37 that are positioned within each chip well 34, 36 and deposited through the opening 30 in the intermediate wall 28 into the chip sorting chamber 20. For example, the chip counting device 44 may include one or more optical sensors that may detect the presence of one or more chips 37 within a chip well 34, 36. Additionally, in order to determine if a deep chip well 36 includes only a single chip 37, or a second chip 37 stacked axially over a first chip 37 located within the deep chip well 36, a finger member 92 may extend into a path of a second axially stacked chip 37 and may temporarily displace the second axially stacked chip 37 radially outward, which may position the chip 37 adjacent to a sensor of the chip counting device 44 and facilitate an accurate counting of the chips 37 within each deep chip well 36 and delivered to the chip sorting chamber 20. Utilizing the motor 38 and the chip counting device 44, the rate of chips 37 delivered to the chip sorting chamber 20 may be regulated, such as by controlling the rotational speed of the pre-separator wheel 24 with the motor 38 in response to the number of chips 37 counted by the chip counting device 44.

A pre-separator wheel 24 that includes a relatively large number of chip wells 34, 36, which may each hold a plurality of chips 37, may allow for the delivery of chips 37 to the chip sorting chamber 20 at a relatively high rate, while maintaining a relatively slow rotational speed. This may be advantageous, as the relatively slow movement of the pre-separator wheel 24 may be relatively quiet and may reduce damage that may otherwise be caused to the chips 37 in the chip hopper chamber 18.

After the chips 37 within the chip wells 34, 36 of the pre-separator wheel 24 have passed the chip counting device 44 the chips 37 may fall out of the chip wells 34, 36 onto the chip delivery ramp 46 coupled to the opening 30 within the intermediate wall 28 and may slide down the chip delivery ramp 46 into the chip sorting chamber 20 and toward the sorting wheel 26. This may allow the chips 37 to be delivered into the chip sorting chamber 20 relatively gently and quietly.

Figure 6:
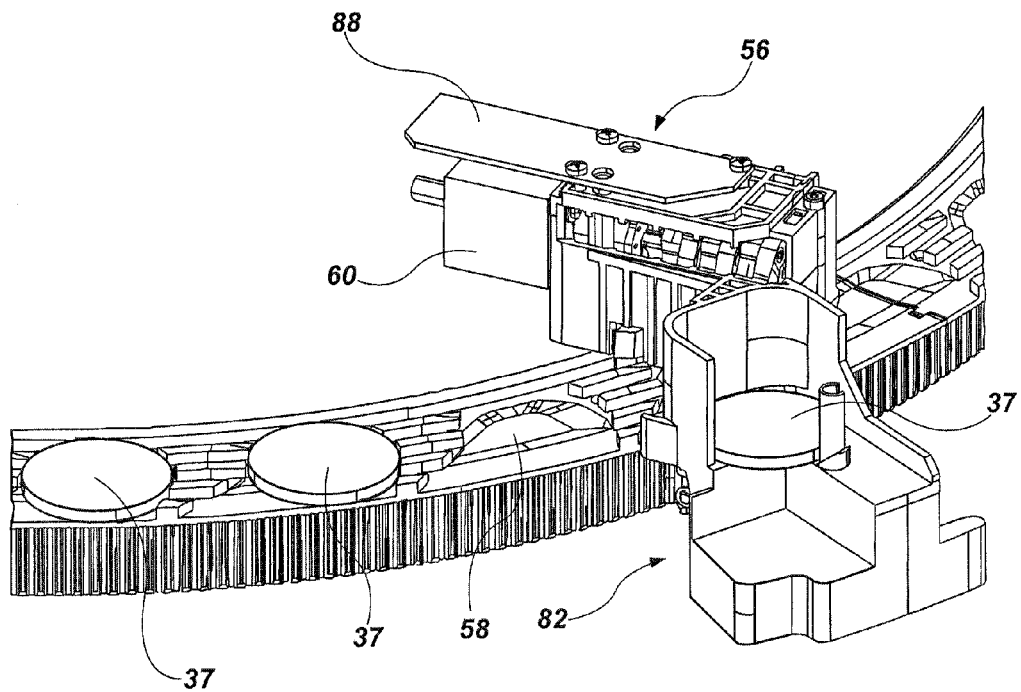
FIG. 6 shows an isometric detail view of a radially outer portion of the sorting wheel of FIG. 3 holding chips in chip wells of the sorting wheel, a chip ejection unit and a portion of a chip tray holding a chip therein.

As shown in FIG. 6, when the chips 37 are delivered into the chip sorting chamber 20, the chips 37 may become positioned in chip wells 58 of the sorting wheel 26, which may be positioned about 40 degrees off plumb, similar to the intermediate wall 28 and the pre-separator wheel 24. The chips 37 may be urged toward the radially outer edge of the sorting wheel 26 by gravity and inertial forces and each chip 37 may become positioned within an individual chip well 58 of the sorting wheel 26, which may be rotated in a counter-clockwise direction by the motor 48 (FIG. 2). The chips 37 may be carried along a circumferential path by the sorting wheel 26 and each chip 37 may be carried past the chip identification unit 54 (FIG. 2), which may be positioned over the circumferential path.

As each chip 37 passes under the chip identification unit 54 (FIG. 2), the chip identification unit 54 may classify each chip according to an identifying feature, such as by one or more of a color evaluation device, an RFID reader, an optical sensor, and a laser sensor. For example, the chip identification unit 54 may include a color line device that may evaluate each chip 37 and identify chips 37 by certain color features that fall within a predetermined color range. By identifying chips 37 that have color features that fall within a predetermined color range, certain chips 37 may be grouped together that have slight variations of color, such as due to inconsistencies in manufacturing the chips 37, dirt or other debris gathering on the chips 37, damage to the chips 37, or other various causes. The classification of each analyzed chip 37, along with each chip's respective position on the sorting wheel 26, may then be transmitted to the main controller 86.

The main controller 86 (FIG. 1) may then activate specific chip ejection units 56 (FIG. 3) that correspond to each chip classification to be sorted as chips 37 pass the chip ejection units 56, and the chips 37 may be deposited onto the chip rack 22 (FIG. 1) in separate elongated chip trays 82, each elongated chip tray 82 corresponding to a specific chip classification.

Figure 7:
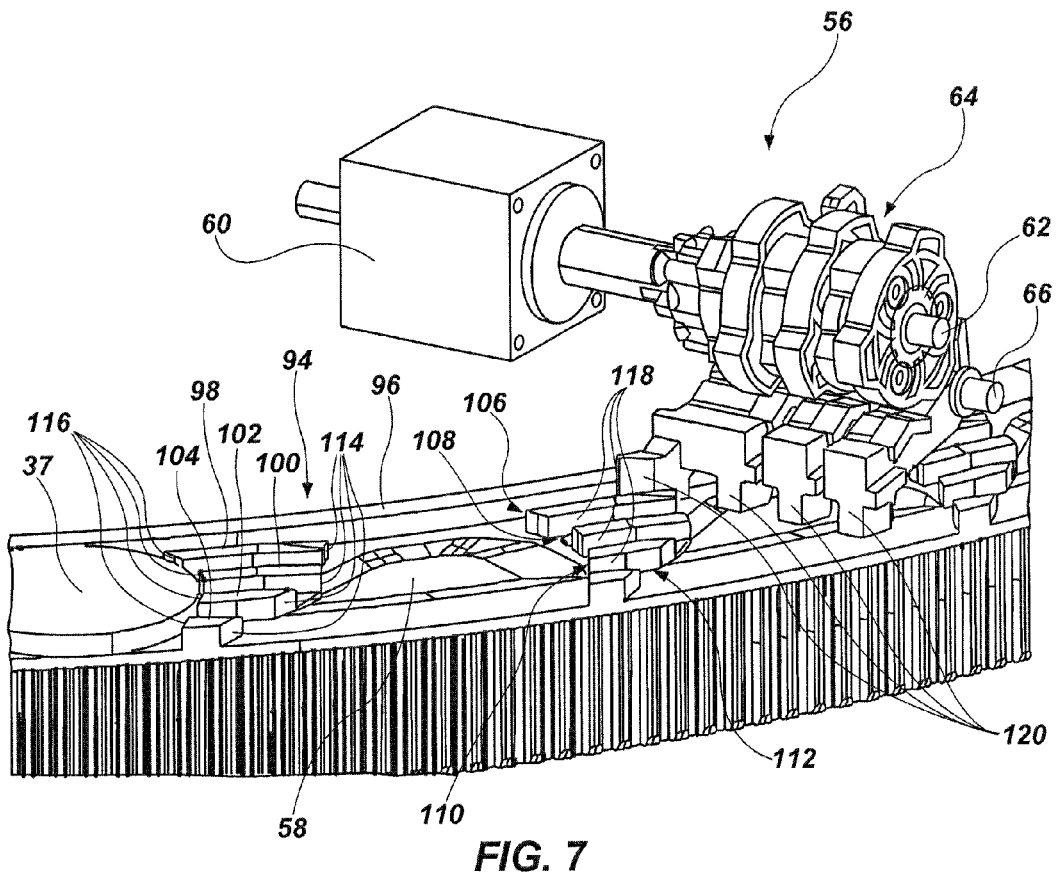
FIG. 7 shows another isometric detail view of the radially outer portion of the sorting wheel of FIG. 6 with portions of the chip ejection unit and the portion of the chip tray removed to show finger members of the chip ejection unit in relationship with the chip wells of the sorting wheel when the finger members are positioned within circumferentially extending channels of the sorting wheel.

In some embodiments, such as shown in FIG. 7, the chip wells 58 may be defined near the radially outer edge of the sorting wheel 26 by radially segmented guide walls 94 comprising a plurality of wall segments 96, 98, 100, 102, 104 spaced radially upon the sorting wheel 26 and defining circumferentially extending channels 106, 108, 110, 112 therebetween. The chip ejection units 56 may comprise finger members 74, 76, 78, 80 sized and positioned to be extended between the wall segments 96, 98, 100, 102, 104 of radially segmented guide walls 94 into the circumferentially extending channels 106, 108, 110, 112. For example, the finger members 74, 76, 78, 80 of the chip ejection units 56 may be positioned axially over the circumferentially extending channels 106, 108, 110, 112, as shown in FIG. 8, and may be selectively movable into the channels 106, 108, 110, 112, as shown in FIG. 7.

In some embodiments, radially segmented guide walls 94 may include a substantially continuous circumferentially extending radially inner wall 96, a first wall segment 98, a second wall segment 100, a third wall segment 102 and fourth wall segment 104. Each wall segment 98, 100, 102, 104 may have a leading face 114, a following face 116 and opposing side faces 118, the leading faces 114 and following faces 116 defining the chip well 58, and the opposing side faces 118 defining the circumferentially extending channels 106, 108, 110, 112. For example, a first circumferentially extending channel 106 may be defined between the substantially continuous circumferentially extending radially inner wall 96 and the first wall segment 98, a second circumferentially extending channel 108 may be defined between the first wall segment 98 and the second wall segment 100, a third circumferentially extending channel 110 may be defined between the second wall segment 100 and the third wall segment 102, and a fourth circumferentially extending channel 112 may be defined between the third wall segment 102 and the fourth wall segment 104. Additionally, each finger member 74, 76, 78, 80 of the chip ejection unit 56 may include a reaction face 120 which may oppose the leading face 114 of each wall segment 98, 100, 102, 104.

Each finger member 74, 76, 78, 80 of the chip ejection unit 56 may be independently operated by one or more respective cams 64 rotating on one shaft 62. Each cam 64 may be mounted to the single cam shaft 62 and the cams 64 may be oriented to move each of the finger members 74, 76, 78, 80 from a first position to a second position, and back to the first position, in a sequence by rotation of the cam shaft 62 with the motor 60 upon receipt of a signal from the main controller 86.

Figure 8:
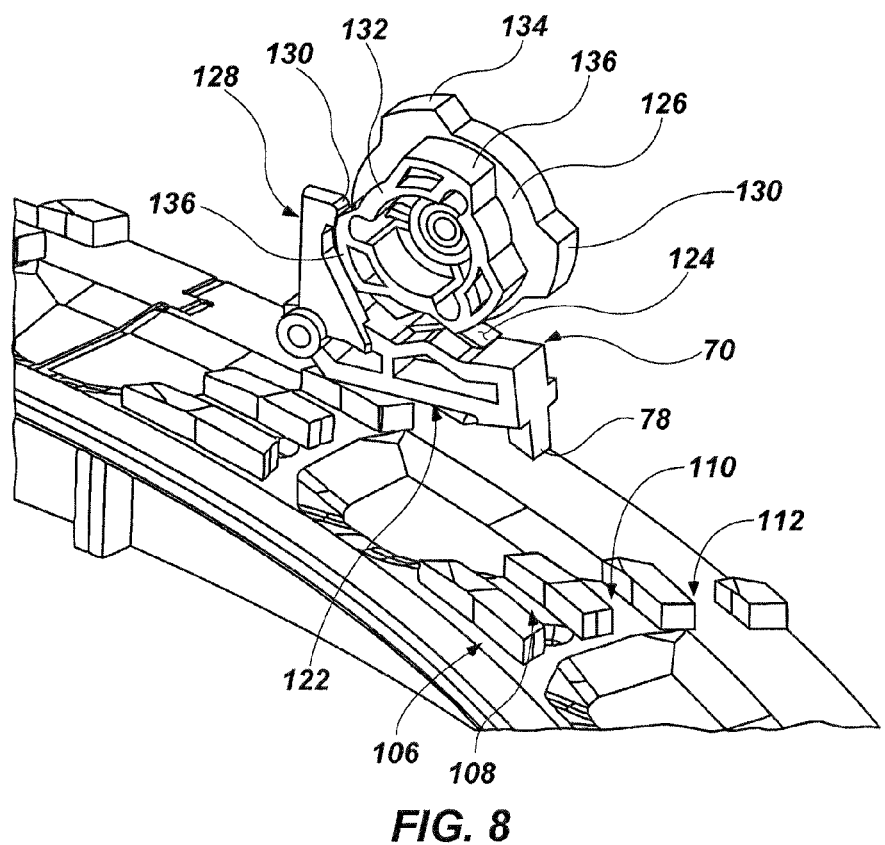
FIG. 8 shows an isometric detail view of the radially outer portion of the sorting wheel of FIG. 6 and a single cam and finger member of the chip ejection unit to show the relationship between the finger and the sorting wheel when the finger member is positioned outside of a circumferentially extending channel of the sorting wheel.

For example, as shown in FIG. 8, each lever assembly 68, 70, 72 may include an extension lever arm 122 having a first cam follower surface 124 positioned adjacent a first cam 126 and a retraction lever arm 128 having a second cam follower surface 130 adjacent a second cam 132. The first cam follower surface 124 of the extension arm 122 may be positioned between the first cam 126 and the sorting wheel 26. During rotation of the first cam 126, when a lobe 134 rotates into contact with the first follower surface 124, the lobe 134 may apply a force on the first follower surface 124 of the extension lever 122 and may urge the third finger member 78 toward the sorting wheel 26 and into a circumferentially extending channel 110 thereof. Additionally, the lobe 134 of the first cam 126 may be moved away from the first cam follower surface 124 and a lobe 136 of the second cam 132 may be rotated into contact with the second cam follower surface 130 of the retraction lever arm 128 and may urge the third finger member 78 away from the sorting wheel 26 and out of the circumferentially extending channel 110 thereof.

Optionally, a biasing means (not shown), such as one or more of a torsion spring, a coil spring, a leaf spring, an elastic structure, and a weighted structure, may be utilized to bias the lever assemblies 68, 70, 72, and a single cam and cam follower surface may be utilized to control the position of the finger members 74, 76, 78, 80.

Figure 9:
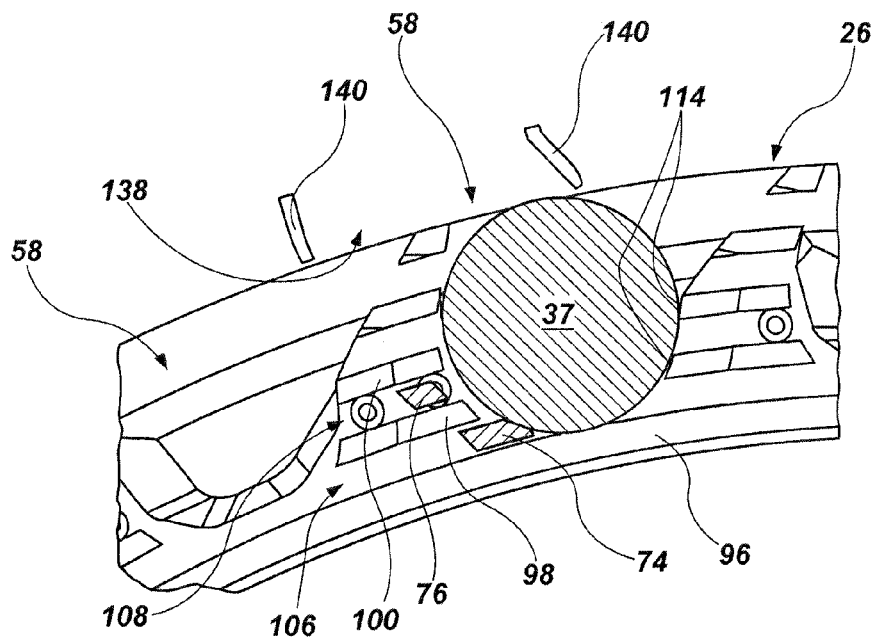
FIG. 9 shows a cross-sectional detail view of a chip positioned within a chip well of the radially outer portion of the sorting wheel of FIG. 6, a wherein first and second finger members are positioned within a first and second circumferentially extending channel of the sorting wheel in a circumferential path of the chip, rotationally preceding the chip.

To eject a selected chip 37 into a selected chip tray 82 through an opening 138, which may include guide walls 140, a chip ejection unit 56 (FIG. 3) corresponding to the selected chip tray 82, which corresponds to the chip classification of the selected chip 37, may be activated and the first and second finger members 74, 76 (See FIG. 5) may be moved from a first position above the first and second circumferentially extending channels 106, 108 to a second position within the first circumferentially extending channel 106, between the substantially continuous circumferentially extending radially inner wall 96, and the second circumferentially extending channel 108, between the first wall segment 98 and the second wall segment 100, circumferentially and rotationally preceding the selected chip 37, as shown in FIG. 9. As the sorting wheel 26 is rotated relative to the first and second finger members 74, 76 and the selected chip 37 is carried along a circumferential path by the sorting wheel 26, an edge of the selected chip 37 may come into contact with the reaction faces 120 of the first and second finger members 74, 76, which may be positioned within the circumferential path of the selected chip 37 and may be angled to face toward the opening 138 into the selected chip tray 82 of the chip rack 22 and the leading faces 114 of the first and second wall segments 98, 100 circumferentially trailing the selected chip 37. The reaction faces 120 of the first and second finger members 74, 76 may urge the selected chip 37 both circumferentially toward the leading faces 114 of the first and second wall segments 98, 100 circumferentially trailing the selected chip 37 and radially outward, toward the opening 138 into the selected chip tray 82. Additionally, the leading faces 114 of the first and second wall segments 98, 100 circumferentially trailing the selected chip 37 may be angled to face both the reaction faces 120 of the first and second finger members 74, 76 and the opening 138 into the selected chip tray 82 and may urge the selected chip 37 radially outward, when the selected chip 37 is pushed toward the leading faces 114 of the first and second wall segments 98, 100.

Figure 10:
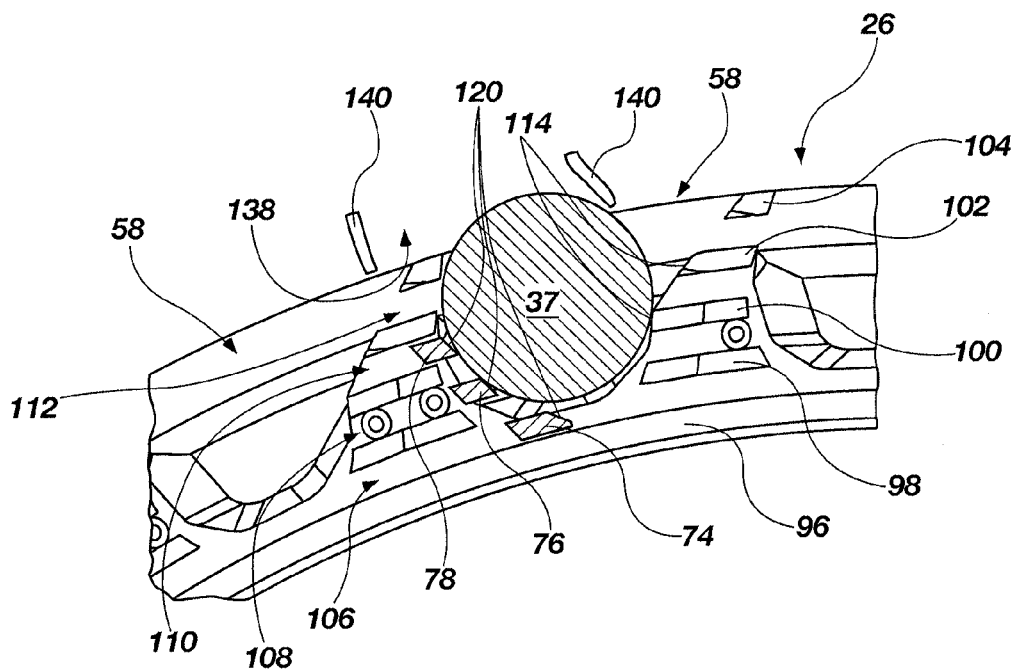
FIG. 10 shows a cross-sectional detail view of the chip positioned within the chip well of the radially outer portion of the sorting wheel of FIG. 9, wherein a third finger member is positioned within a third circumferentially extending channel of the sorting wheel in a circumferential path of the chip, rotationally preceding the chip.

As shown in FIG. 10, the third finger member 78 may then be lowered by the chip ejection unit 56 into the third circumferentially extending channel 110 rotationally preceding the selected chip 37 and within the circumferential path of the selected chip 37. Similarly to the reaction faces 120 of the first and second finger members 74, 76 and the leading faces 114 of the first and second wall segments 98, 100, the reaction face 120 of the third finger member 78 may cooperate with the leading faces 114 of the second and third wall segments 100, 102 to urge the selected chip 37 further radially outward, toward the opening 138 into the selected chip tray 82 of the chip rack 22, as the sorting wheel 26 is further rotated relative to the finger members 74, 76, 78 and the selected chip tray 82. Additionally, as shown in FIG. 10, the guide walls 140 may facilitate the guiding of the selected chip 37 through the opening 138 into the selected chip tray 82.

Figure 11:
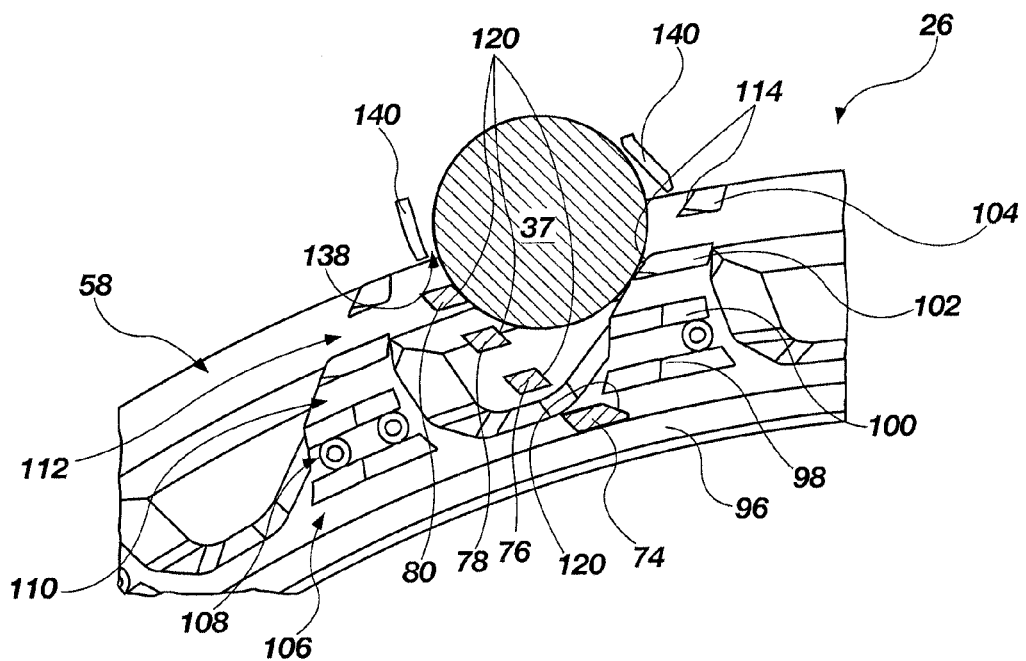
FIG. 11 shows a cross-sectional detail view of the chip positioned within the chip well of the radially outer portion of the sorting wheel of FIG. 10, wherein a fourth finger member is positioned in the circumferential path of the chip, rotationally preceding the chip.

Next, the fourth finger member 80 may be lowered by the chip ejection unit 56 into alignment with the fourth circumferentially extending channel 112 rotationally preceding the selected chip 37 and within the circumferential path of the selected chip 37, as shown in FIG. 11. Similarly to the reaction faces 120 of the first, second and third finger members 74, 76, 78, the reaction face 120 of the fourth finger member 80 may cooperate with the leading faces 114 of the third and fourth wall segments 102, 104 to further urge the selected chip 37 radially outward, toward the opening 138 into the selected chip tray 82 of the chip rack 22, as the sorting wheel 26 is rotated further. As may be observed in FIG. 11, the reaction faces 120 of the finger members 74, 76, 78, 80 may generally align with a guide wall 140 of the opening 138 into the selected chip tray 82.

Figure 12:
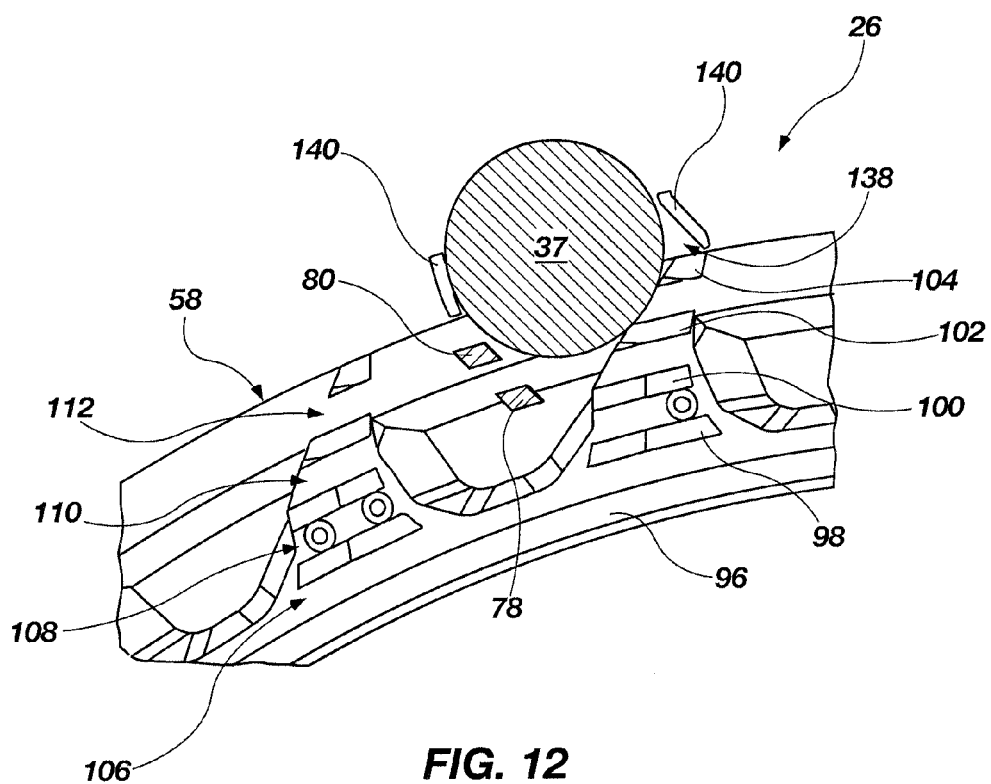
FIG. 12 shows a cross-sectional detail view of the chip positioned within the chip well of the radially outer portion of the sorting wheel of FIG. 11, wherein the first and second finger members are positioned out of the first and second circumferentially extending channels of the sorting wheel and out of the circumferential path of any chip.
Figure 13:
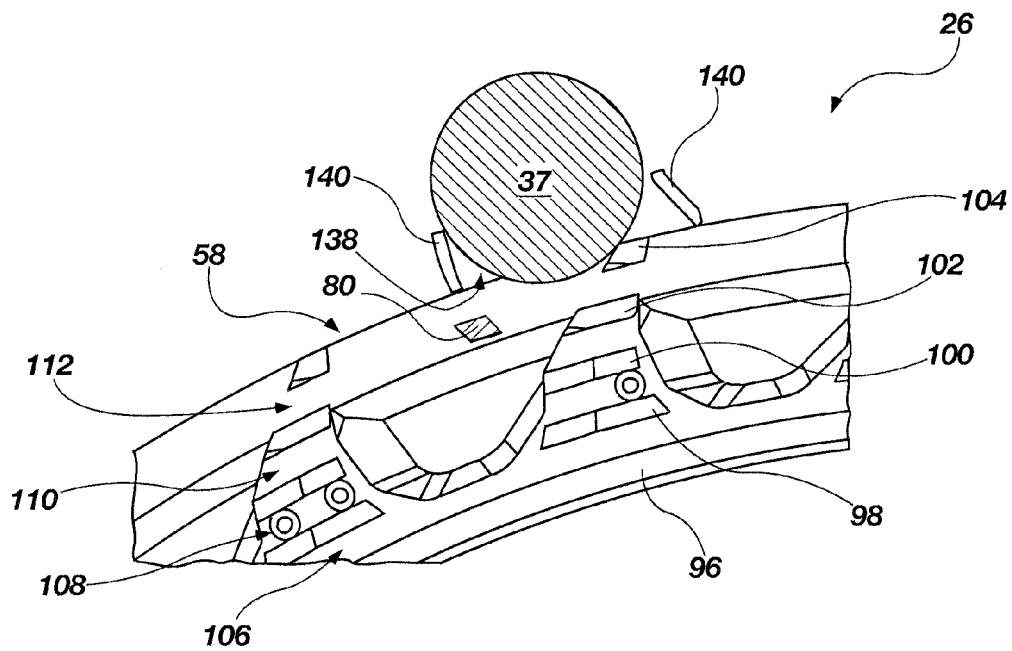
FIG. 13 shows a cross-sectional detail view of the chip positioned within the chip well of the radially outer portion of the sorting wheel of FIG. 12, wherein the third finger is positioned out of the circumferential path of any chip.
Figure 14:
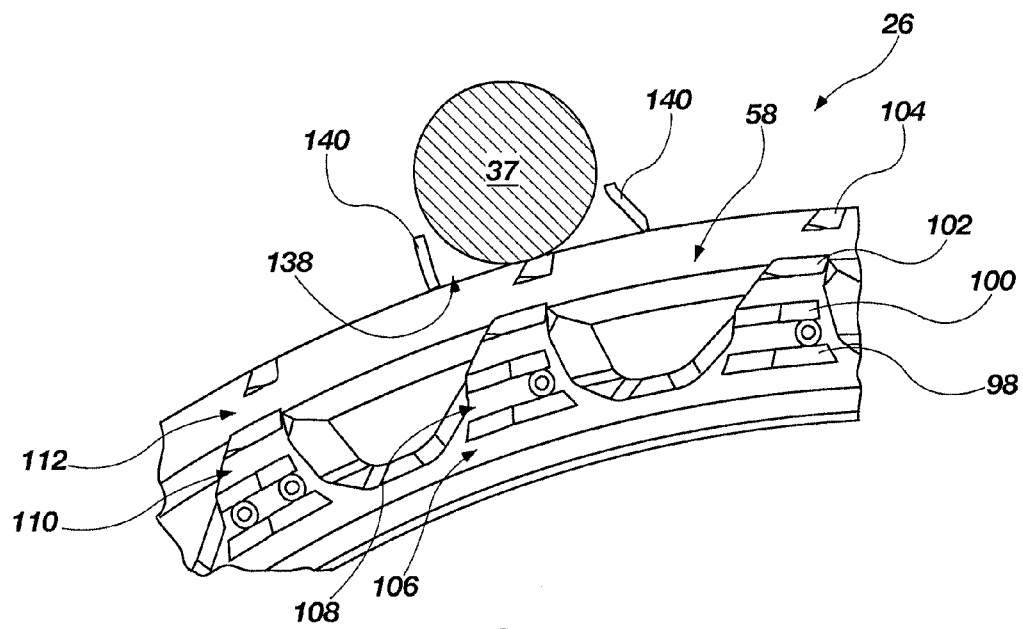
FIG. 14 shows a cross-sectional detail view of the chip positioned within the chip well of the radially outer portion of the sorting wheel of FIG. 13, wherein the fourth finger is positioned out of the circumferential path of any chip.

If a following chip has not been selected to be ejected into the selected chip tray 82, the first and second finger members 74, 76 may be lifted out, over the first and second circumferentially extending channels 106, 108 as the selected chip 37 is urged toward the opening 138 into the chip tray 82 by the third and fourth finger members 78, 80, as shown in FIG. 12. This may prevent the reaction faces 120 of the first and second finger members 74, 76 from contacting a chip in a following chip well 58 that has not been selected to be ejected into the selected chip tray 82 of the chip rack 22. Similarly, the third and fourth finger members 78, 80 may be independently and sequentially lifted out, over the third and fourth circumferentially extending channels 110, 112 as the selected chip 37 is urged toward the opening 138 into the selected chip tray 82, as shown in FIGS. 13 and 14. This ability to independently move certain finger members 74, 76, 78, 80 of the chip ejection unit 56 between a first position and a second position allows the chip wells 58 of the sorting wheel 26 to be positioned relatively close together, allowing a relatively large number of chip wells 58 to be positioned on the sorting wheel 26, which increases the rate at which chips 37 are sorted by the chip sorting device 10.

Optionally, if a following chip 37 has been selected to be ejected into the selected chip tray 82, each of the finger members 74, 76, 78, 80 of the chip ejection unit 56 may remain within the paths of the respective first, second, third and fourth circumferentially extending channels 106, 108, 110, 112 and in a circumferential path of the following selected chip 37 and the following selected chip 37 may be ejected into the selected chip tray 82 of the chip rack 22. Similarly, any number of following selected chips 37 may be ejected in such a manner and the finger members 74, 76, 78, 80 of the chip ejection unit 56 may be moved out of the paths of the circumferentially extending channels 106, 108, 110, 112 when a next rotationally following chip 37 is not selected to be ejected into the selected chip tray 82 of the chip rack 22.

The ejection system of the present invention advances fingers 74, 76, 78, 80 sequentially such that chips are removed from wells 58 without being struck or jarred. This is an important attribute, as chips formed from clay can easily be damaged during sorting and stacking when the ejectors deliver a concussion-type force to the edge of the chip.

Although the ejection system has been described above as providing four fingers that move independently, the embodiment described herein provides fingers that move sequentially in response to rotation of a unitary shaft 62 that supports the cams that move the fingers.

By providing an ejection system that moves chips radially out of wells 58 without concussion forces, the noise associated with ejection is also reduced, improving product acceptance.

Additionally, the inclusion of a chip ejection unit 56 for each chip tray 82 of the chip rack 22 may allow a plurality of chips 37 positioned within chip wells 58 of the sorting wheel 26 to be substantially simultaneously ejected into a plurality of chip trays 82 of the chip rack 22.

Figure 15:
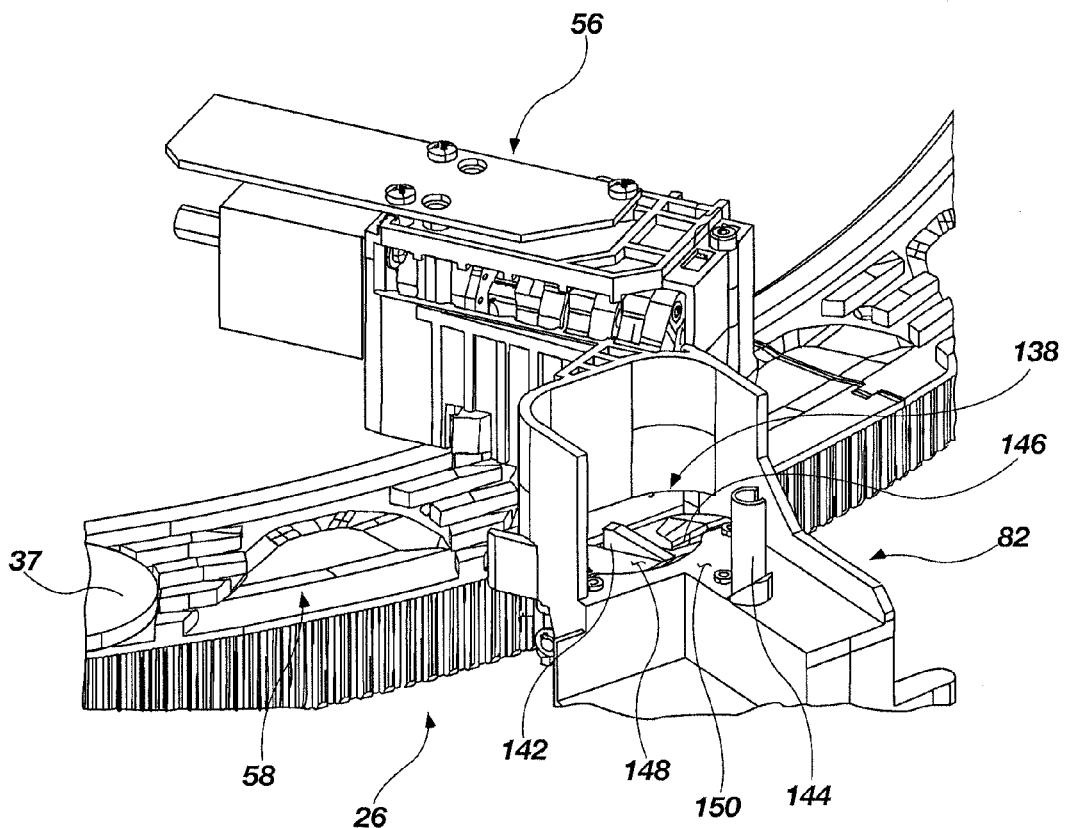
FIG. 15 shows an isometric detail view of the radially outer portion of the sorting wheel, the chip ejection unit and the portion of the chip tray of FIG. 6 without any chips in the chip tray to show the opening into the chip tray.

As shown in FIG. 15, each chip tray 82 of the chip rack 22 may include a movable barrier 142 located at the opening 138 from the chip sorting chamber 20 and a soft barrier 144. The movable barrier 142 may obstruct the opening 138 to the chip tray 82 to prevent the inadvertent ejection of a nonselected chip 37 into the chip tray 82 when a nonselected chip 37 passes the chip tray 82. When a selected chip 37 enters the opening 138 to the chip tray 82, the movable barrier 142 may be moved to a second retracted position, to provide an unobstructed opening 138 into the chip tray 82. Upon entry of the selected chip 37 into the chip tray 82, the movable barrier 142 may return to the original blocking position and may urge the selected chip 37 upward in the chip tray 82. The soft barrier 144 may relatively gently stop the movement of the inserted chip 37 at a specified location, upon insertion to the chip tray 82, and facilitate the arrangement of inserted chips 37 into an axial stack within the chip tray 82.

Figure 16:
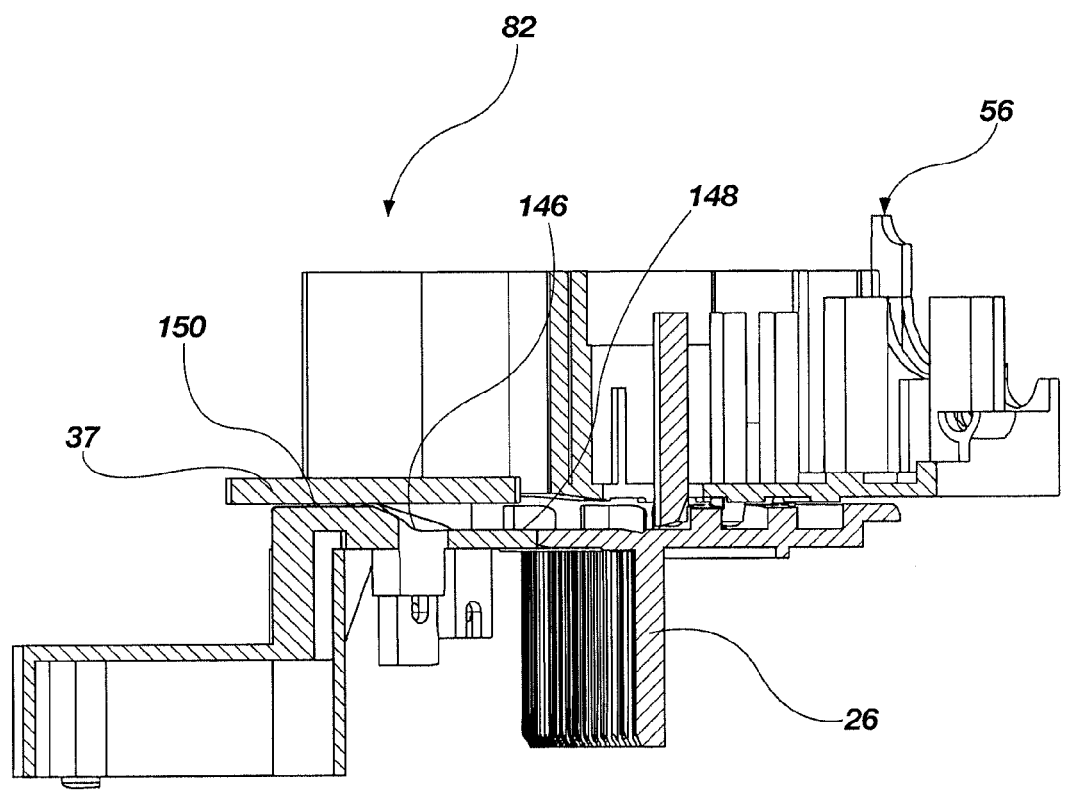
FIG. 16 shows a cross-sectional detail view of the radially outer portion of the sorting wheel, the chip ejection unit and the portion of the chip tray of FIG. 6 including a chip in the chip tray to show the relationship between components of the chip tray and a chip.

Additionally, as shown in FIG. 16, each chip tray 82 may include a ramp 146 that may provide a transition between a lower surface 148 and an upper surface 150, which may be slightly greater than the height of a chip 37. In view of this, a first selected chip 37 may be aligned with the lower surface 148 as the first selected chip 37 enters the opening 138 into the chip tray 82 and may be guided up the ramp 146 during insertion into the chip tray 82. Upon complete insertion into the chip tray 82, the first selected chip 37 may then become aligned with the upper surface 150 and come to rest on the upper surface 150. When a second selected chip 37 may be inserted into the chip tray 82, the second chip 37 may similarly be aligned with the lower surface 148 as the second chip 37 enters the opening 138 into the chip tray 82 and may be guided up the ramp 146 during insertion into the chip tray 82. In this manner, the second selected chip 37 may be inserted below the first selected chip 37, may urge the first selected chip 37 upwards and may come to rest on the upper surface 150 below the first selected chip 37 in an axially stacked arrangement.

Figure 17:
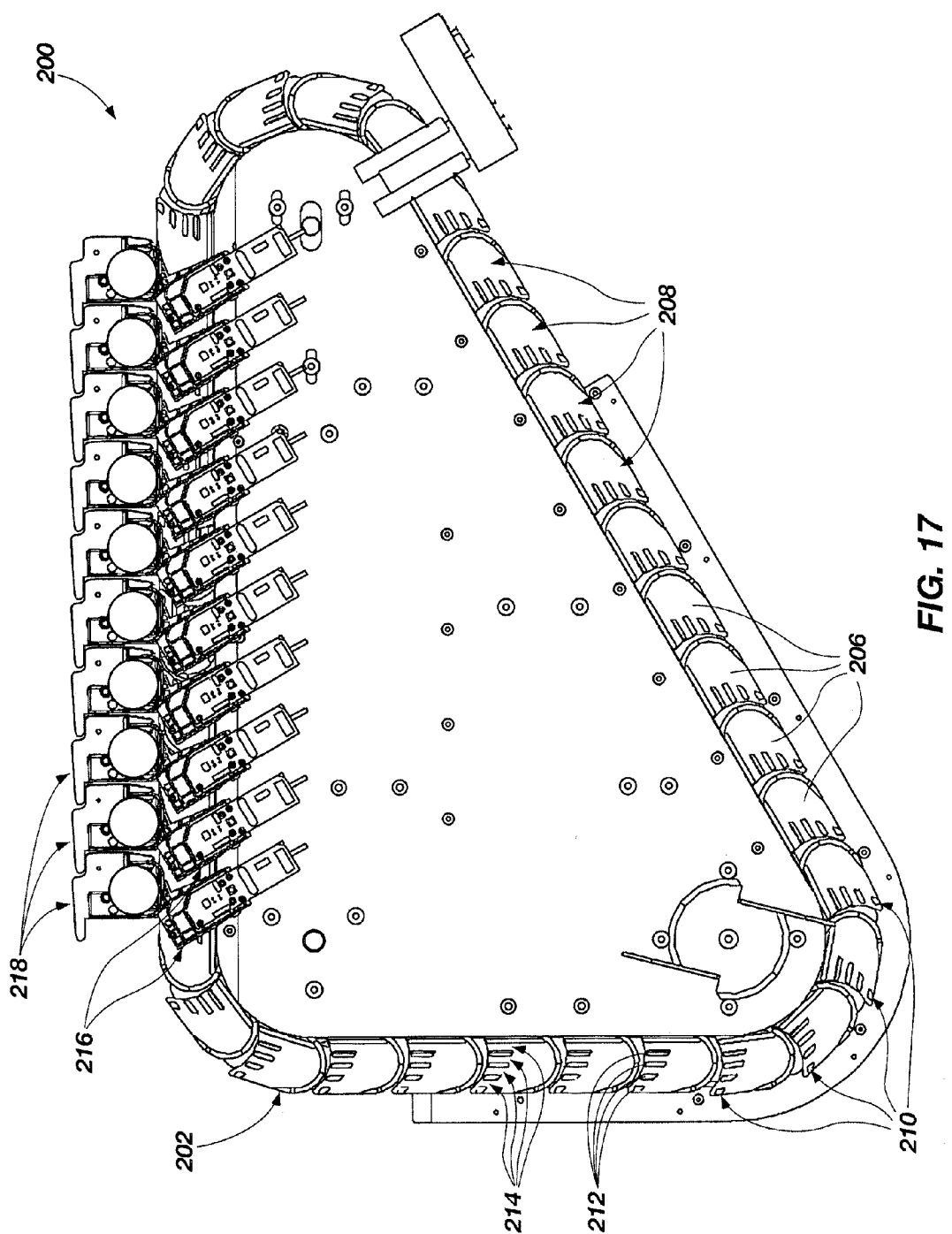
FIG. 17 shows an isometric view of a portion of another chip sorting device, including an articulated conveyor, according to another embodiment of the present invention, with portions removed to show interior components of the chip sorting device.

In additional embodiments, a chip sorting device 200 may include another type of chip conveying unit, such as an articulated conveyor 202, which may be arranged along a fixed path within a chip sorting chamber, as shown in FIG. 17. The articulated conveyor 202 may comprise a plurality of articulated link units 206 and each link unit 206 may include a chip well 208 for carrying at least one chip 37. Each chip well 208 may be defined by and adjacent to segmented guide walls 210 comprised of a plurality of wall segments 212 and a plurality of channels 214 may be defined between wall segments 212 of the plurality of wall segments 212.

The fixed path may be arranged such that each link unit 206, and any chips 37 that may be carried thereby, may travel along a generally straight path (i.e., a substantially linear path) when proximate to chip ejection units 216 and corresponding chip trays 218 of a chip rack. In this embodiment, a lower and optionally upper edge of the chip rack is linear, to facilitate a close fit to a rectangular notch cut into the roulette table top. In view of this, the wall segments 212 of the plurality of wall segments 212 may be spaced laterally along each link unit 206 and may extend longitudinally along each link unit 206. Additionally, the channels 214 defined between wall segments 212 of the plurality of longitudinally extending wall segments 212 may also extend longitudinally along each link unit 206. For example, each of the wall segments 212 of the plurality of wall segments 212 and each of the channels 214 may extend along a generally straight path (i.e., a substantially linear path).

The chip ejection units 216 may be similar to the chip ejection units 56 described with reference to FIGS. 1-16, and the chip ejection units 216 may include similar finger members each configured to be positioned from a first position outside of a longitudinally extending channel 214, to a second position within a longitudinally extending channel 214. Additionally, the finger members of the chip ejection units 216 may include reaction faces that may cooperate with leading faces of trailing wall segments 212 to eject chips 37 laterally out of the chip wells 208 (i.e., a chip 37 may be ejected radially with respect to the initial orientation of the chip 37 within the chip well 208), similarly to the ejection units 56 described with reference to FIGS. 1-16. For example, each finger member of an ejection unit 216 may be positioned within a channel 214 of the articulated conveyor 202 into a linear path of a chip 37, preceding the chip 37, and the articulated conveyor 202 may be moved to move the chip 37 into contact with the finger members of the ejection unit 216. Then, the reaction faces of the finger members of the ejection unit 216 may cooperate with leading faces of trailing wall segments 212 to urge the chip 37 laterally out of the chip well 208.

Although this invention has been described with reference to particular embodiments, the invention is not limited to these described embodiments. Rather, the invention is limited only by the appended claims, which include within their scope all equivalent devices, systems and methods.

What is claimed is:

1. A chip handling device, comprising:
   a first chip chamber;
   a second chip chamber, separate from the first chip chamber and in communication with the first chip chamber through an opening; and
   a separating wheel in communication with the first chip chamber, the separating wheel comprising a plurality of radially extending arms defining a plurality of chip wells extending from an outer edge of the separating wheel toward an inner portion of the separating wheel, each chip well configured to hold a plurality of chips and to carry chips in a circumferential path and deposit chips in the opening into the second chip chamber, wherein the plurality of chip wells comprises a first plurality of chip wells and a second plurality of chip wells, wherein each chip well of the first plurality of chip wells extends radially inward toward the inner portion of the separating wheel a distance greater than each chip well of the second plurality of chip wells.

2. The chip handling device of claim 1, wherein the first plurality of chip wells and the second plurality of chip wells alternate around a circumference of the separating wheel.

3. The chip handling device of claim 1, further comprising a chip counting device positioned within the first chip chamber and configured to count the number of chips carried within each chip well of the plurality of chip wells.

4. The chip handling device of claim 3, wherein the chip counting device comprises at least one optical sensor.

5. The chip handling device of claim 3, further comprising a motor for rotating the separating wheel, wherein the chip counting device is configured to control a rate of chips delivered to the second chip chamber by controlling a rotational speed of the separating wheel with the motor in response to a number of chips counted by the chip counting device.

6. The chip handling device of claim 1, further comprising a ramp extending from the opening into the second chip handling chamber toward a sorting wheel.

7. A chip handling device, comprising:
   a first chip chamber;
   a second chip chamber, separate from the first chip chamber and in communication with the first chip chamber through an opening; and
   a separating wheel in communication with the first chip chamber, the separating wheel comprising a plurality of radially extending arms defining a plurality of chip wells extending from an outer edge of the separating wheel toward an inner portion of the separating wheel, each chip well configured to hold a plurality of chips and to carry chips in a circumferential path and deposit chips in the opening into the second chip chamber, wherein the plurality of chip wells comprises a plurality of elongated chip wells and a plurality of deep chip wells alternating around a circumference of the separating wheel, each elongated chip well of the plurality of elongated chip wells configured to hold a plurality of chips positioned radially edge-to-edge and each deep chip well of the plurality of deep chip wells configured to hold a plurality of chips stacked axially.

8. A chip handling device, comprising:
   a first chip chamber;
   a second chip chamber, separate from the first chip chamber and in communication with the first chip chamber through an opening;
   a separating wheel in communication with the first chip chamber, the separating wheel comprising a plurality of radially extending arms defining a plurality of chip wells extending from an outer edge of the separating wheel toward an inner portion of the separating wheel, each chip well configured to hold a plurality of chips and to carry chips in a circumferential path and deposit chips in the opening into the second chip chamber;
   a chip counting device positioned within the first chip chamber and configured to count the number of chips carried within each chip well of the plurality of chip wells; and
   a finger positioned within a circumferential path of at least one chip well of the plurality of chip wells, the finger configured to temporarily displace at least one chip in the at least one chip well.

9. The chip handling device of claim 8, wherein the at least one chip well comprises a deep chip well configured to hold a plurality of chips stacked axially, wherein the finger is configured to temporarily displace at least one axially stacked chip in the at least one chip well to at least partially uncover at least one chip underlying the at least one axially stacked chip to facilitate counting a number of chips positioned within the deep chip well.

10. A chip sorting device, comprising:
    a chip hopper chamber;
    a chip sorting chamber, separate from the chip hopper chamber and in communication with the chip hopper chamber through an opening;
    a separating wheel positioned within the chip hopper chamber, the separating wheel comprising a plurality of chip wells configured to hold a plurality of chips stacked axially and to carry chips in a circumferential path and deposit chips in the opening into the chip sorting chamber; and
    a chip counting device positioned within the chip hopper chamber and configured to count the number of chips carried within each chip well of the plurality of chip wells.

11. The chip sorting device of claim 10, wherein the separating wheel further comprises another plurality of chip wells alternating with the plurality of chip wells around the circumference of the separating wheel.

12. The chip sorting device of claim 11, wherein each chip well of the another plurality of chip wells is configured to hold a plurality of chips positioned radially edge-to-edge.

13. A method of transporting chips, the method comprising:
    loading a plurality of chips from a chip hopper chamber at a first location into a plurality of chip wells of a separating wheel, comprising:
        disposing at least two chips of the plurality of chips into a first chip well of the plurality of chip wells of the separating wheel to axially stack the at least two chips within the first chip well; and
        disposing at least two chips of the plurality of chips into a second chip well of the plurality of chip wells of the separating wheel to position the at least two chips radially adjacent to one another;
    rotating the separating wheel about a central axis; and
    depositing the plurality of chips from the plurality of chip wells of the separating wheel into a chip sorting chamber.

14. The method of claim 13, further comprising counting each chip of the plurality of chips within the plurality of chip wells with a chip counting device as each chip is rotated in the separating wheel.

15. The method of claim 14, further comprising adjusting a rate at which chips are delivered to the chip sorting chamber by controlling a rotational speed of the separator wheel with a motor in response to a number of chips counted by the chip counting device.

16. A method of transporting chips, the method comprising:
    loading a plurality of chips from a chip hopper chamber at a first location into a plurality of chip wells of a separating wheel, comprising:
        alternating between disposing at least two chips of the plurality of chips into a chip well of the plurality of chip wells to position the at least two chips radially adjacent to one another and disposing at least two chips of the plurality of chips into an additional chip well of the plurality of chip wells to axially stack the at least two chips within the additional chip well;
    rotating the separating wheel about a central axis; and
    depositing the plurality of chips from the plurality of chip wells of the separating wheel into a chip sorting chamber.

17. A method of transporting chips, the method comprising:
    loading a plurality of chips from a chip hopper chamber at a first location into a plurality of chip wells of a separating wheel, comprising:
        disposing at least one chip of the plurality of chips into a first chip well of the plurality of chip wells of the separating wheel; and
        disposing at least two chips of the plurality of chips into a second chip well of the plurality of chip wells of the separating wheel to position the at least two chips radially adjacent to one another;
    rotating the separating wheel about a central axis;
    positioning a finger within a circumferential path of at least one chip well of the plurality of chip wells;
    counting each chip of the plurality of chips within the plurality of chip wells with a chip counting device as each chip is rotated in the separating wheel;
    temporarily displacing at least one chip in the at least one chip well; and
    depositing the plurality of chips from the plurality of chip wells of the separating wheel into a chip sorting chamber.

18. The method of claim 17, wherein disposing at least one chip of the plurality of chips into a first chip well of a plurality of chip wells of the separating wheel comprises positioning at least two chips of the plurality of chips into the first chip well to axially stack the at least two chips within the first chip well and further comprising:
    positioning a finger within a circumferential path of the first chip well;
    temporarily displacing at least one chip of the at least two chips in the first chip well; and
    counting each chip of the at least two chips in the first chip well while temporarily displacing the at least one chip.

* * * * *